No. 638,575.  
W. GUAY.  
ICE VELOCIPEDE.  
(Application filed Jan. 26, 1899.)  
Patented Dec. 5, 1899.

(No Model.)

Witnesses  
S. Sweeney  
Dexter E. Kiley

Inventor  
Wilfrid Guay  
By Allen Webster  
Attorney

United States Patent Office.

WILFRID GUAY, OF SPRINGFIELD, MASSACHUSETTS.

ICE-VELOCIPEDE.

SPECIFICATION forming part of Letters Patent No. 638,575, dated December 5, 1899.

Application filed January 26, 1899. Serial No. 703,449. (No model.)

*To all whom it may concern:*

Be it known that I, WILFRID GUAY, a citizen of the Dominion of Canada, residing in Springfield, in the county of Hampden and State of Massachusetts, have invented certain new and useful Improvements in Ice-Velocipedes, of which the following is a specification.

My invention relates to a velocipede designed to be used on ice.

The object of my invention is to provide a velocipede of the class designated above that is light but strong and durable, inexpensive, and easy to propel and steer.

Furthermore, my object is to produce an ice-velocipede by utilizing the ordinary bicycle-frame as one of the elements therein, in which the rear runner is located directly beneath the driving-wheel, with relation to which it is adjustable to the extent necessary for said wheel to strike its spurs deep enough in the ice to properly propel the machine.

That my invention may be seen and fully understood by those skilled in the art, reference will be had to the following specification and accompanying drawings, in which—

Figure 1:
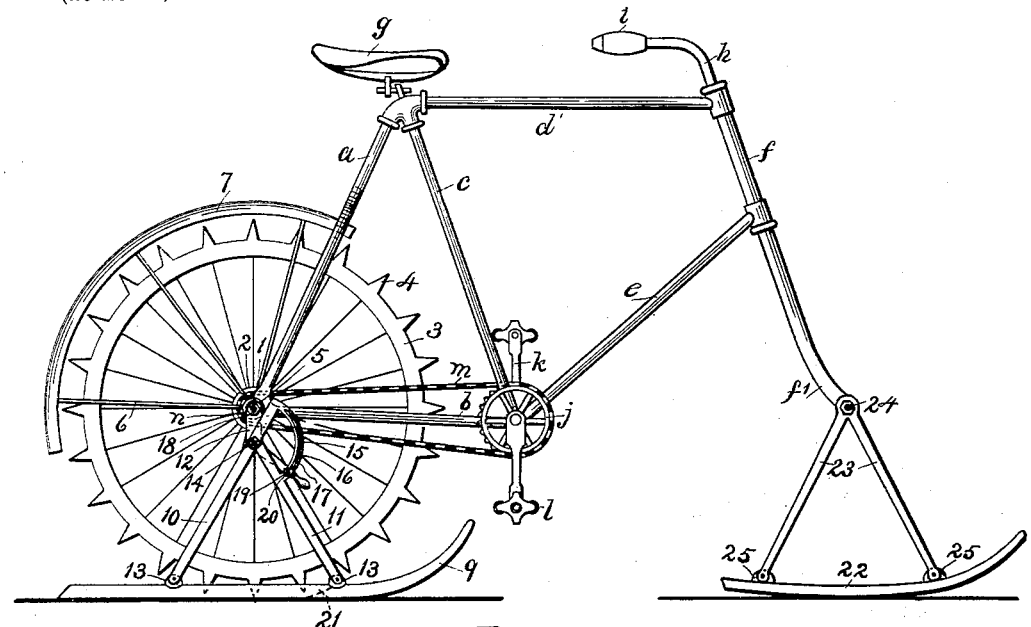
Figure 2:
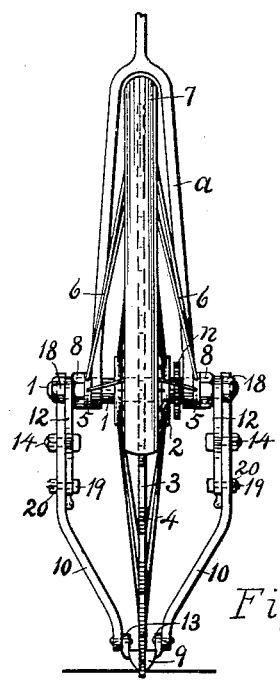
Figure 3:
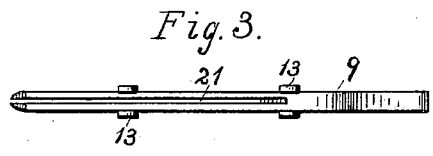

Figure 1 is a side view of my invention; Fig. 2, an enlarged rear end elevation of the same, the upper terminal of the rear fork being broken off; and Fig. 3, a top view of the rear runner.

Similar letters and figures of reference designate like parts in the drawings and specification.

Referring to Fig. 1, the ordinary diamond frame of a bicycle is seen, consisting of the rear forks $a$ and $b$, the tubular braces $c$, $d$, and $e$, and the head $f$, in which is mounted a steering-post terminating at the bottom in the front fork $f'$. The said frame has the usual seat $g$ mounted thereon, and the steering-post is provided with the handle-bars and handles common to bicycles, as indicated at $h$ and $i$. The said frame is further equipped with the sprocket-wheel $j$, cranks $k$, and with the sprocket-chain $m$, connecting the wheel $j$ with the sprocket-wheel $n$, fast on the rear axle 1. Up to this point the parts are old and familiar.

The axle 1 is journaled in the rear end of the frame, and the hub 2 of the driving-wheel 3 is fast to the center of said shaft between the bifurcations of the forks $a$ and $b$. The rim of the wheel 3 is thin and has the spurs 4 around its periphery, said spurs being adapted to strike into the ice and propel the velocipede when said wheel is revolved. The sprocket-wheel $n$ is located between the right side of the hub 2 and the corresponding bifurcations of the forks $a$ and $b$, while the collars 5 5 for the braces 6 of the guard 7 encircle the axle 1 outside of the junction formed by the fork $a$ with the fork $b$, against which said collars are securely held by the nuts 8 8. The guard 7 covers about a third of the wheel 3 and prevents the particles of ice picked up by the spurs 4 from being thrown onto the rider.

The rear runner 9 supports practically the weight of the whole of the rear part of the machine through the medium of the integral arms 10 and 11 and the adjusting-arms 12, one set of these arms being upon each side of the wheel 3. The arms 10 and 11 have their bases attached to the lugs 13 on the runner 9 and at their junctions 14 they are pivoted to the arms 12. A segmental connection 15, having the pivotal point 14 for a center, extends from the top of each arm 10 to the front edge of each arm 11. Each connection 15 is provided with the slot 16 and scale 17. The upper ends of the arms 12 loosely encircle the outer ends of the axle 1 contiguous with the nuts 8, being held in place by the nuts 18 18, and bolts 19 and nuts 20 are employed to rigidly clamp the lower terminals of said arms to the connections 15. The ends of the axle 1 are reduced in diameter to provide a bearing-surface for the arms 12 outside of the threaded portions required for the nuts 8. The bolts 19 pass through the slots 16 on the segmental connections 15, and the scales 17 on the latter enable the arms 12 to be adjusted alike. The runner 9 has the slot 21 cut into the same from the back end and extending longitudinally for nearly two-thirds the length of said runner, and the wheel 3 operates through this slot between each pair of arms 10, 11, and 12.

The forward runner 22 is connected with the fork $f$ by the arms 23, pivoted at 24 to said fork and having their bases attached to the runner-lugs 25. The under edge of the runner 22 is curved longitudinally for its entire length in order to secure as short a bearing-surface on the ice as practical, this bearing-surface being intermediate of the ends of the runner. The object of the construction noted above is to provide a steering-runner that can be turned to the right or left by the steering-post without scraping the ice as extensively as a straight-faced runner does, or, in other words, to produce a runner by means of which the steering capacity of my machine is enhanced.

It will be understood from the foregoing description that my velocipede is supported on the runners 9 and 22 and driven by the spurred wheel 3, the power to propel and steer the vehicle being applied in precisely the same manner as for a bicycle. Different surfaces of ice or frozen snow over which it is desired to use this machine require that the runner 9 be adjusted relative to the wheel 3, so as to regulate the depth below said runner to which the spurs 4 must be driven into the slippery surface in order to produce the greatest speed with the least effort. By loosening the nuts 20 or grasping the free terminals or handles of the arms 12 and moving the latter on the axle 1 the arms 10 and 11, with attached runner, are elevated or depressed, according to the direction given said arms 12, swinging on the pivots 14. As the runner 9 is elevated the spurs 4 project farther below the former and cut deeper into the ice. During the adjustment just referred to the stud 19 moves in the segmental slot 16, and when the desired height is reached the nuts 20 are retightened to secure the arms 12 to the connections 15, as before, care being taken to have said arms register with the same marks on opposite scales 17 to insure a vertical position to the runner. With the present construction the runner 9 is carried forward slightly when elevated and rearwardly when depressed.

I do not restrict myself to the specific means shown and described for securing the arms 12 to the connections 15, as it is obvious that a ratchet or some other well-known means may be employed for the purpose without departing from the spirit of my invention. Although for the sake of cheapness and convenience I prefer to use a frame and driving mechanism common to bicycles, I have no intention of confining my invention thereto, as any frame and power device applicable and suitable for the purpose may be employed with my improvements.

What I claim as my invention, and desire to secure by Letters Patent, is—

In an ice-velocipede the combination of a suitable frame, a pivotally-supported steering-runner at the front of the frame, a runner at the rear of the frame, having a solid front portion and a slotted rear portion, a driving-wheel journaled at the rear end of the frame and formed with spurs on its perimeter which engage through the slot in the rear runner, runner-supporting arms 10 and 11 having their lower ends suitably secured to the runner remote from each other and their upper ends united, adjusting-arms 12 having their upper ends loosely mounted on the axle of the driving-wheel and their lower portions connected to the union of the arms 10 and 11, and their lower ends extending below their connection to the said arms 10 and 11, segmental connections 15, formed with slots, which are engaged by lugs or bolts on the free ends of the arms 12, whereby the rear runner may be adjusted up or down, all substantially as and for the purpose specified.

WILFRID GUAY.

Witnesses:
ALLEN WEBSTER,
JERRY BORDEAU.